United States Patent
Fujii et al.

(10) Patent No.: US 8,971,174 B2
(45) Date of Patent: Mar. 3, 2015

(54) RESTART METHOD AND NODE DEVICE

(71) Applicant: Fujitsu Limited, Kawasaki-shi, Kanagawa (JP)

(72) Inventors: Masaaki Fujii, Kawasaki (JP); Hiroaki Yamamoto, Itoshima (JP)

(73) Assignee: Fujitsu Limited, Kawasaki (JP)

( * ) Notice: Subject to any disclaimer, the term of this patent is extended or adjusted under 35 U.S.C. 154(b) by 150 days.

(21) Appl. No.: 13/715,087

(22) Filed: Dec. 14, 2012

(65) Prior Publication Data

US 2013/0242717 A1 Sep. 19, 2013

(30) Foreign Application Priority Data

Mar. 19, 2012 (JP) ................... 2012-062891

(51) Int. Cl.
*H04L 12/26* (2006.01)
*H04L 12/703* (2013.01)
*H04L 12/723* (2013.01)

(52) U.S. Cl.
CPC .............. *H04L 45/28* (2013.01); *H04L 45/507* (2013.01)
USPC ....................................................... 370/217

(58) Field of Classification Search
None
See application file for complete search history.

(56) References Cited

U.S. PATENT DOCUMENTS

| | | | | |
|---|---|---|---|---|
| 7,508,772 B1* | 3/2009 | Ward et al. | ..... | 370/254 |
| 7,680,028 B1* | 3/2010 | Zamfir et al. | ..... | 370/216 |
| 7,787,380 B1* | 8/2010 | Aggarwal et al. | ..... | 370/236 |
| 7,969,865 B2* | 6/2011 | Nonaka | ..... | 370/216 |
| 8,339,942 B2* | 12/2012 | Liu et al. | ..... | 370/218 |
| 8,462,805 B2* | 6/2013 | Chen et al. | ..... | 370/428 |
| 2003/0210705 A1* | 11/2003 | Seddigh et al. | ..... | 370/419 |
| 2005/0111351 A1* | 5/2005 | Shen | ..... | 370/217 |
| 2006/0013126 A1 | 1/2006 | Yasuoka et al. | | |
| 2006/0176828 A1* | 8/2006 | Vasseur et al. | ..... | 370/252 |
| 2007/0053359 A1* | 3/2007 | Wu et al. | ..... | 370/392 |
| 2009/0086623 A1* | 4/2009 | Gao et al. | ..... | 370/221 |
| 2009/0310482 A1* | 12/2009 | Asaie et al. | ..... | 370/225 |
| 2012/0026955 A1* | 2/2012 | Benjebbour et al. | ..... | 370/329 |

FOREIGN PATENT DOCUMENTS

JP 2006-33124 2/2006

* cited by examiner

*Primary Examiner* — Anh-Vu Ly
(74) *Attorney, Agent, or Firm* — Staas & Halsey LLP (57) ABSTRACT

A restart method that performs restart in a label transfer network, the restart method includes: selecting, by a restart node, one or more adjacent nodes based on a processing capacity of the restart node, setting a selected adjacent node as a restart group and notifying the selected adjacent node of restart; restoring, based on a label value of a path notified by the selected adjacent node, an entry corresponding to the path using a label table that associates the path with the label; and repeating a notification of restart and a restoration of an entry to restore the label table.

12 Claims, 11 Drawing Sheets

TABLE (PRIORITY N)

| NODE | NUMBER OF LSPs |
|---|---|
| I | $N_i$ |
| J | $N_j$ |
| K | $N_k$ |
| ... | ... |
| ... | ... |
| ... | ... |
| ... | ... |
| ... | ... |
| L | $N_l$ |

| SETUP PRIORITY | HOLDING PRIORITY | FLAGS | NAME LENGTH |
|---|---|---|---|
| SESSION NAME ||||

TABLE (PRIORITY 0)

| NODE | NUMBER OF LSPs |
|---|---|
| A | Na |
| B | Nb |
| C | Nc |
| D | Nd |

FIG. 8B

TABLE (PRIORITY 1)

| NODE | NUMBER OF LSPs |
|---|---|
| E | Ne |
| F | Nf |
| G | Ng |
| ... | ... |
| ... | ... |
| ... | ... |
| H | Nh |

TABLE (PRIORITY N)

| NODE | NUMBER OF LSPs |
|---|---|
| I | Ni |
| J | Nj |
| K | Nk |
| ... | ... |
| ... | ... |
| ... | ... |
| ... | ... |
| ... | ... |
| L | Nl |

FIG. 11

RESTART METHOD AND NODE DEVICE

CROSS-REFERENCE TO RELATED APPLICATION

This application is based upon and claims the benefit of priority of the prior Japanese Patent Application No. 2012-62891, filed on Mar. 19, 2012, the entire contents of which are incorporated herein by reference.

FIELD

The embodiments discussed herein are related to a restart method and a node device.

BACKGROUND

In a label transfer network, Multi-Protocol Label Switching (MPLS) is used where a label is assigned to a packet and data is transferred.

Resource reSerVation Protocol (RSVP) is a protocol where a bandwidth to a transmission destination is reserved on a network and communication quality is secured. In the RSVP, priority is given to traffic such as a television conference or real-time moving image distribution, for which immediacy or continuity is desired.

In RSVP-Traffic Engineering (RSVP-TE) specified by a technical standard document, Request For Comments (RFC) 3209, or the like, a label used in the MPLS is reserved with respect to the RSVP, and a HELLO message is defined so as to detect an adjacent device failure or a link failure.

A related technique is disclosed in Japanese Laid-open Patent Publication No. 2006-33124.

SUMMARY

According to one aspect of the embodiments, a restart method that performs restart in a label transfer network, the restart method includes:

selecting, by a restart node, one or more adjacent nodes based on a processing capacity of the restart node, setting a selected adjacent node as a restart group and notifying the selected adjacent node of restart; restoring, based on a label value of a path notified by the selected adjacent node, an entry corresponding to the path using a label table that associates the path with the label; and repeating a notification of restart and a restoration of an entry to restore the label table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Graceful-Restart is used in an MPLS communication device utilizing RSVP-TE signaling. For example, even if a HELLO message, a Path message, or a Resv message is discontinued in a control plane, communication in a data plane is continued, and state information (Path state information or Resv state information) is restored to a state preceding a failure, after the failure recovery of the control plane. The HELLO message is used for detecting a failure or the like, the Path message is used for setting a path or the like, and the Resv message is used for a reception response or the like.

At the time of restart, the Graceful-Restart restores a state preceding the restart based on a message from an adjacent node. If restart is performed when a large number of Label Switched Paths (LSPs) are set among a large number of adjacent nodes, a large amount of processing occurs in a restart node.

In the Graceful-Restart, while a HELLO message is transmitted from the restart node so as to indicate the restart to an adjacent node, when the adjacent node does not receive the HELLO message during a certain set restart time, processing for acquiring a new label is performed and communication disconnection in the data plane occurs during the processing for acquiring the new label.

Figure 1:
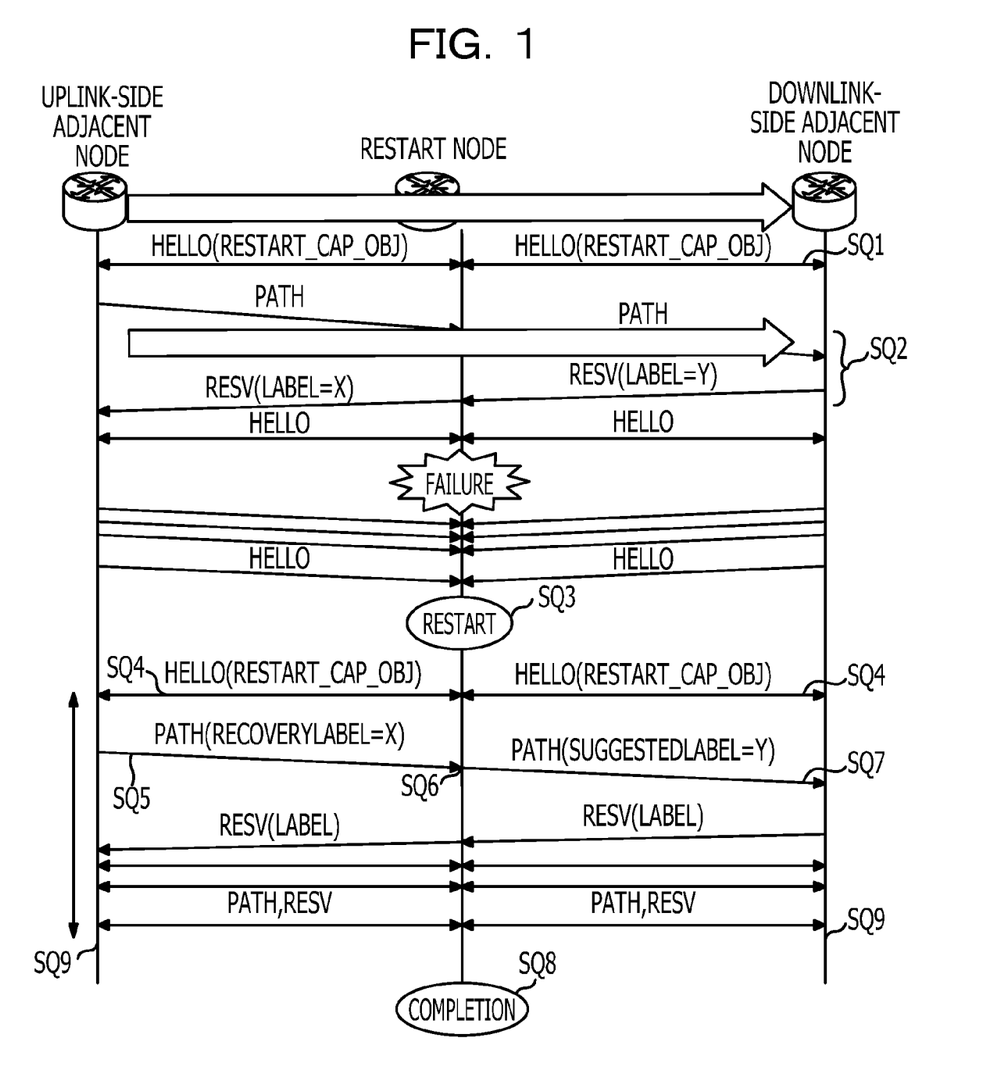
FIG. 1 illustrates an exemplary Graceful-Restart.

FIG. 1 illustrates an exemplary Graceful-Restart. In FIG. 1, while an adjacent node is coupled to each of the uplink side and the downlink side of a restart node, a plurality of nodes may be coupled to each of the uplink side and the downlink side of the restart node.

In a sequence SQ1, the restart node transmits a "Restart_Cap Object" to the adjacent node in a HELLO message, and notifies the adjacent node of Graceful-Restart. A restart time is preliminarily notified by the "Restart_Cap Object" and a maximum time taken to restart is also notified. When having received the "Restart_Cap Object", the adjacent nodes on the uplink side and the downlink side recognize that a transmission source node is able to perform Graceful-Restart.

In a sequence SQ2, an LSP is created. Using a Path message or a Resv message, label swapping is performed.

In a sequence SQ3, after restart, the restart node performs marking on the "stale" of every entry in a label table. The restart node designates a recovery time using "Restart_Cap Object" within the HELLO message. The implement of recovery processing where the label table is refreshed and restored within the recovery time is notified to the adjacent nodes on the uplink side and the downlink side.

In a sequence SQ4, when having received the "Restart_Cap Object" of the HELLO message, the adjacent nodes on the uplink side and the downlink side perform marking on the "stale" of a entry in the label tables which corresponds to the restart node.

In a sequence SQ5, using a "Recovery Label Object" of the Path message, the adjacent node on the uplink side notifies the restart node of a label distributed by the restart node in the LSP where refresh is to be performed.

In a sequence SQ6, based on the label value of the "Recovery Label Object" of the notified Path message, the restart node refers to the label table and acquires a label value distributed from the adjacent node on the downlink side. Based on the acquired label value, a label value distributed to the LSP and the node on the uplink side and the label value distributed from the adjacent node on the downlink side are acquired, the state of RSVP-TE is restored and the "stale" of the label table is deleted.

Figure 2:
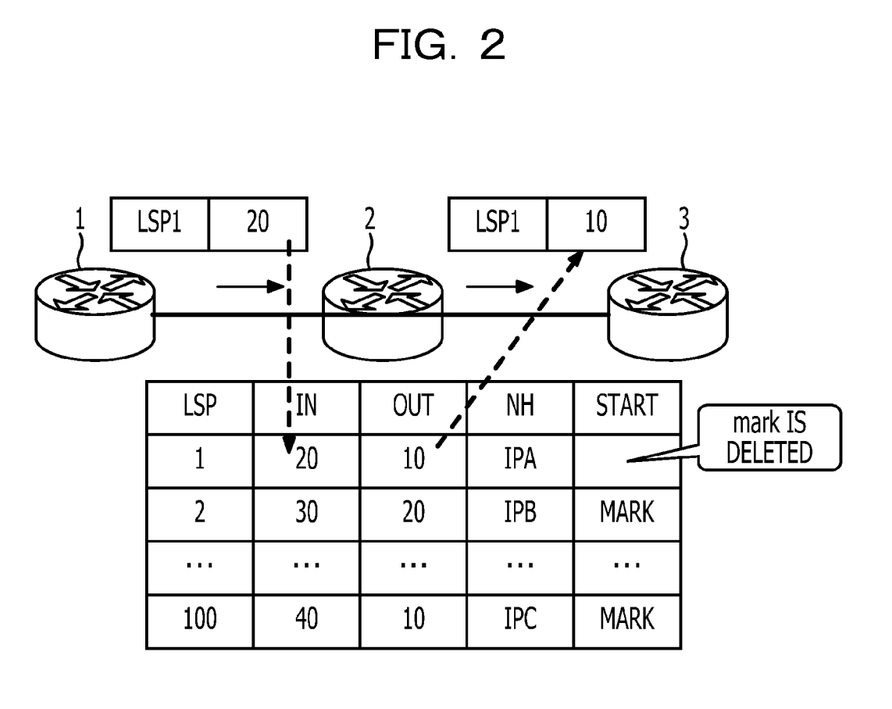
FIG. 2 illustrates an exemplary label table.

FIG. 2 illustrates an exemplary label table. The label table includes an input label value (in), an output label value (out), a next hop (NH), and stale for each LSP number. In a sequence SQ6, for example, a Path message of an input label value=20 is supplied from the uplink-side adjacent node to the restart node. The restart node refers to the label table using the input label value=20, and obtains an output label value=10 and a next hop=IPa. The restart node deletes the marking of the "stale" of an entry in the label table, changes the label value of the Path message to an output label value=10, and transmits to the downlink-side adjacent node corresponding to the next hop=IPa.

In a sequence SQ7, using a "Suggested Label Object" of the Path message, the restart node notifies the adjacent node on the downlink side of the label distributed by the adjacent node on the downlink side in the LSP. The adjacent node on the downlink side that has received the label deletes the "stale" of the label table. When a Resv message from the adjacent node on the downlink side has been notified to the adjacent node on the uplink side through the restart node, the adjacent node on the uplink side deletes the marking of the "stale" of the label table.

In a sequence SQ8, sequences SQ4 to SQ7 are repeated with respect to all LSPs, and the restart node restores the whole state of the label table. When the recovery time has elapsed, the restart node deletes an entry where marking remains in "stale" so as to delete an unrefreshed LSP from the label table.

In a sequence SQ9, when the recovery time received from the restart node has elapsed, the adjacent node deletes an entry where marking has been performed on "stale" so as to delete an unrefreshed LSP from the label table.

Figure 3:
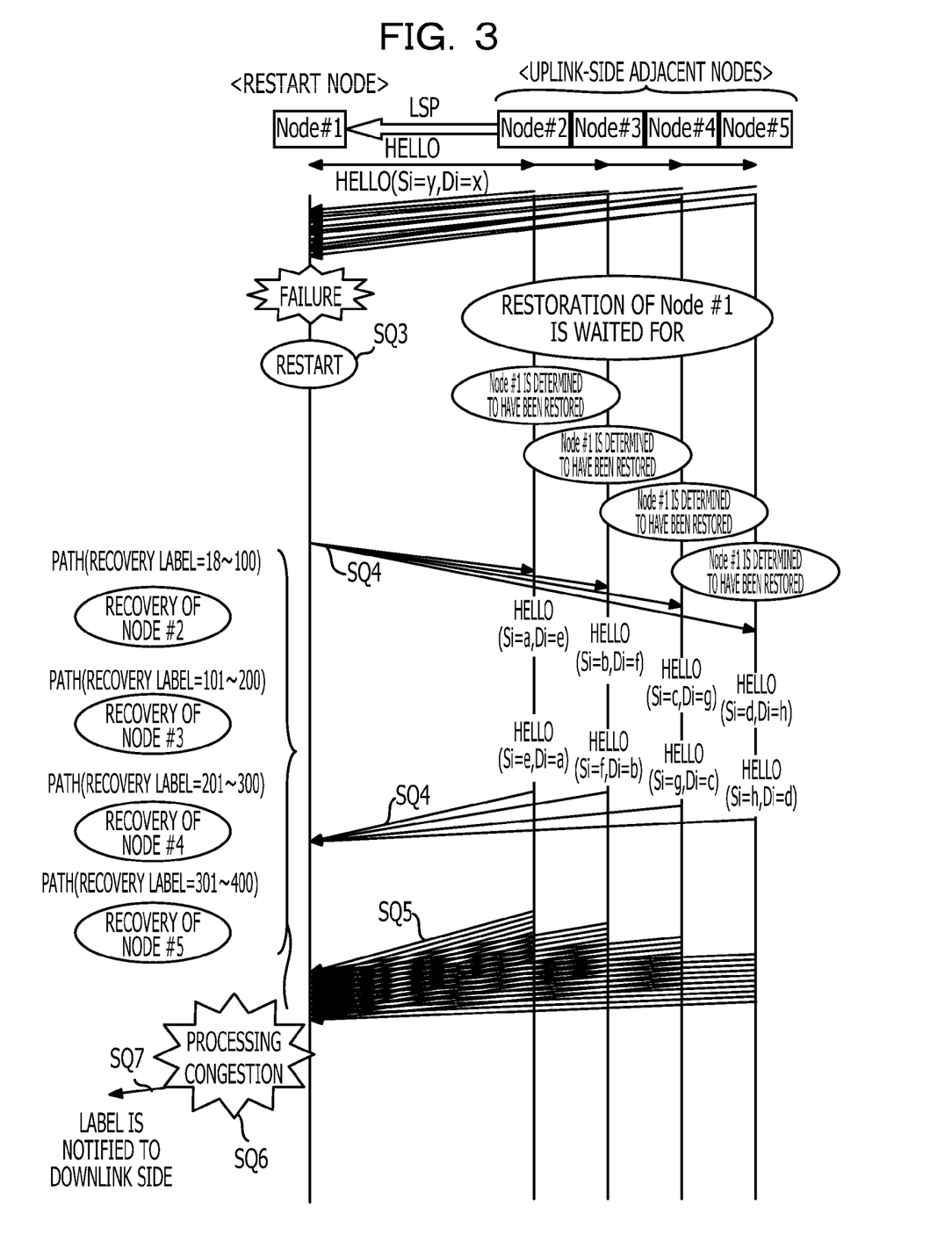
FIG. 3 illustrates an exemplary recovery processing.

FIG. 3 illustrates an exemplary recovery processing. In FIG. 3, the sequence diagram of the congestion of recovery processing for Graceful-Restart is illustrated.

At the time of restart, in a sequence SQ4, the restart node transmits a HELLO message to all adjacent nodes, and receives HELLO messages from all the adjacent nodes.

In a sequence SQ5, the restart node receives a label by a Path message with a "Recovery Label Object".

In a sequence SQ6, the restart node performs recovery processing for an LSP, and restores the label table.

In a sequence SQ7, if a downlink-side adjacent node exists, the restart node transmits a Path message.

Since, in a sequence SQ5, Path messages with "Recovery Label Objects" are received from all adjacent nodes on the uplink side, and recovery processing in the sequence SQ6 is performed, the recovery processing may become congested.

For example, the technical standard document RFC3473 states that messages with "Recovery Label Objects" on an adjacent node on an uplink side are dispersed and transmitted and does not state a handling in a restart node. The restart node may contemporaneously receive Path messages with "Recovery Label Objects" from a plurality of uplink-side adjacent nodes.

Therefore, all entries in the label table may not be restored within the recovery time. Since the restart node executes the label acquisition processing again, communication disconnection in the data plane may occur.

In a network, since the number of LSPs contained in one node increases, the number of Path messages with "Recovery Label Objects" in the sequence SQ5 may increase after the reception of a HELLO message, the Path messages being transmitted back from one adjacent node to the restart node. Since the control processing speed of each node increases, a delay difference before the reception of Path messages with "Recovery Label Objects" in the sequence SQ5 may decrease after the reception of a HELLO message, the Path messages being sent back from each adjacent node to the restart node. A Path message transmission interval for each LSP may be shortened.

In the sequence SQ6 based on the reception of Path messages with "Recovery Label Objects", which is transmitted from each node, in the sequence SQ5, LSP processing may be concentrated in a short period of time and the congestion of the recovery processing may occur.

Figure 4:
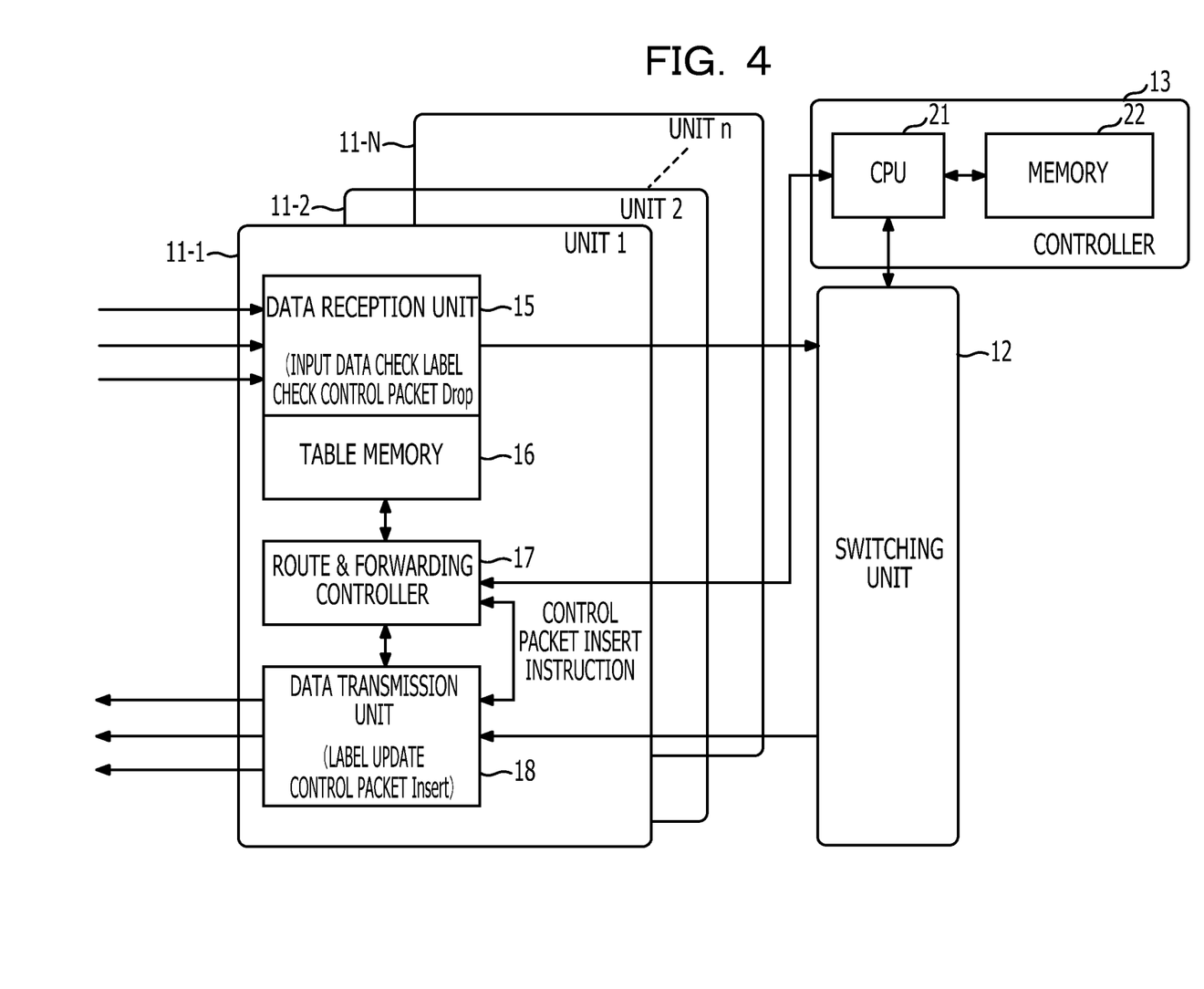
FIG. 4 illustrates an exemplary node device.

FIG. 4 illustrates an exemplary node device. The node device illustrated in FIG. 4 includes a plurality of input-output units 11-1 to 11-N, a switching unit 12, and a controller 13. Each of the input-output units 11-1 to 11-N includes a data reception unit 15, a table memory 16, a route & forwarding controller 17, and a data transmission unit 18. The data reception unit 15 performs input data check for input data input from a plurality of ports, label check, or extraction of a control packet. A label table is stored in the table memory 16.

The data reception unit 15 supplies a next hop (NH) to the route & forwarding controller 17 with referring to the label table based on the label of an input packet, and supplies an input packet to the switching unit 12. Control from the route & forwarding controller 17 is notified to a CPU 21 within the controller 13, and the switching of the switching unit 17 is controlled by the CPU 21. The input packet is supplied to the data transmission unit 18 in the input-output units 11-1 to 11-N, which corresponds to the next hop. The data reception unit 15 supplies, to the route & forwarding controller 17, a control packet such as an extracted HELLO message, Path message, or Resv message.

In response to the control of the route & forwarding controller 17, the data transmission unit 18 changes the label of a packet to be output, and outputs control packets generated in the route & forwarding controller 17, from a plurality of ports.

By executing a various kinds of programs stored in the memory 22, the CPU 21 in the controller 13 performs switching control processing in the switching unit 17, Graceful-Restart processing, table update processing, restart order determination processing, or the like. In the memory 22, a node information table is stored that is used in the table update processing or the restart order determination processing.

Figure 5:
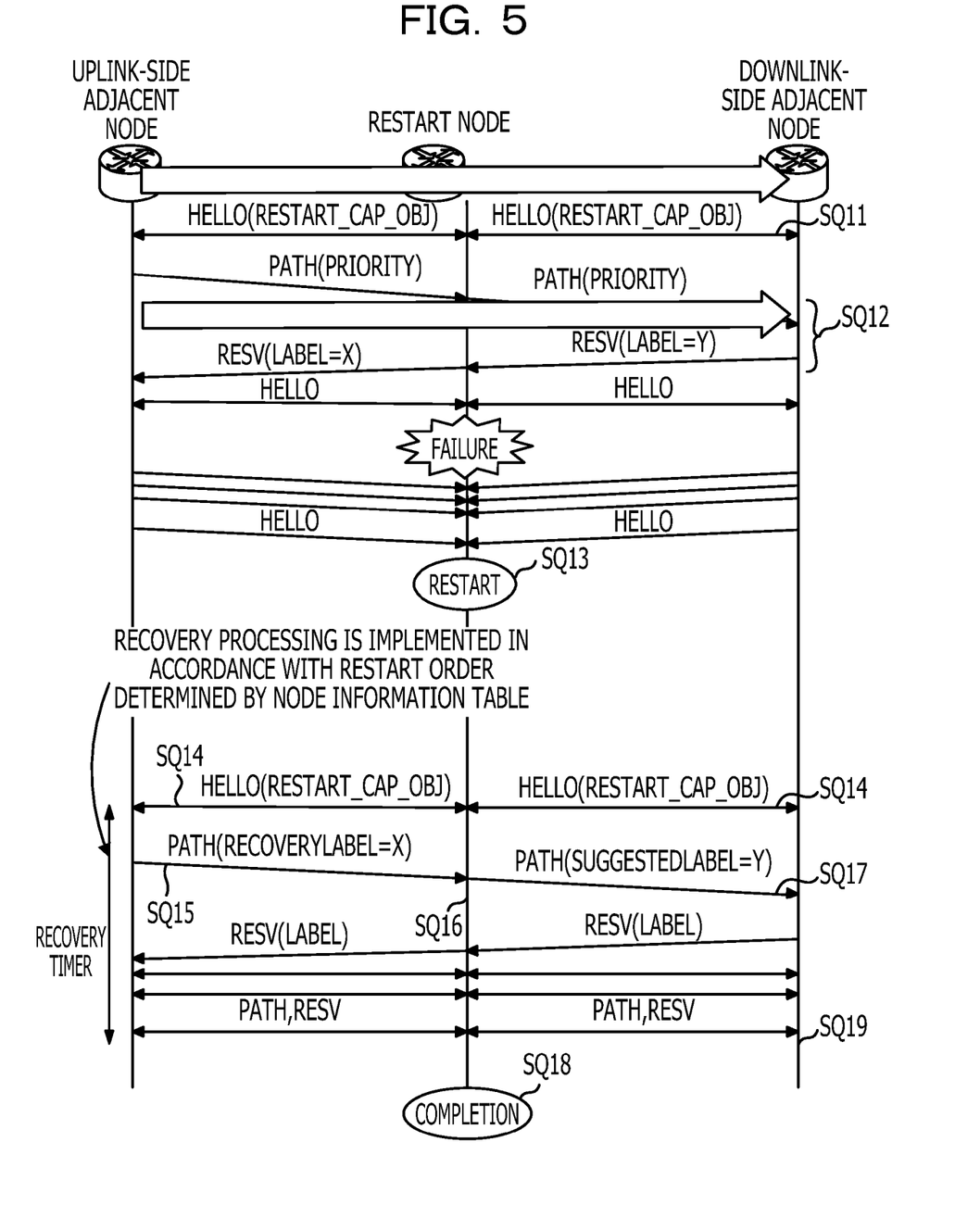
FIG. 5 illustrates an exemplary Graceful-Restart.

FIG. 5 illustrates an exemplary Graceful-Restart. While, in FIG. 5, one adjacent node is described on each of an uplink side and a downlink side, a plurality of nodes may be coupled.

In a sequence SQ11, a restart node transmits a "Restart_Cap Object" to the adjacent node during a HELLO message, and notifies the adjacent node of Graceful-Restart. A restart time is preliminarily notified using the "Restart_Cap Object", and a maximum time taken to restart is also notified. When having received the "Restart_Cap Object", the adjacent nodes on the uplink side and the downlink side recognize that a transmission source node is able to perform Graceful-Restart.

In a sequence SQ12, an LSP is created. Using a Path message or a Resv message, label swapping is performed. The adjacent node on the uplink side transmits a Path message with priority (Priority) to the restart node.

Figure 6:
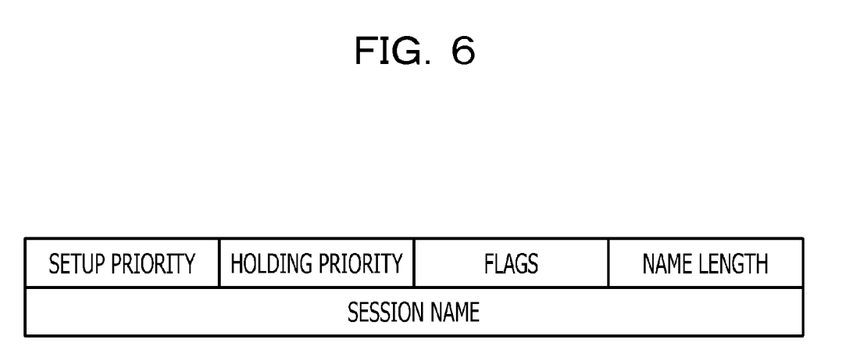
FIG. 6 illustrates an exemplary format of a Session_Attribute Object.

The information of the Priority is transmitted using the setup priority value or hold priority value of a Session_Attribute within a Label Distribution Protocol (LDP) message serving as the label distribution protocol of MPLS. FIG. 6 illustrates an exemplary format of a Session_Attribute Object. The setup priority value indicates the Priority when an LSP tunnel is established. The hold priority value indicates the Priority for holding a current path when a competition in the use of a path occurs owing to another LSP tunnel. Using an unused bit of an LDP message such as the Path message or the Resv message, the Priority may be transmitted.

When the LSP is set, a refresh interval is set by a TIME_VALUE of the Path message, the LSP is confirmed within the refresh interval, and refresh is performed. Therefore, an LSP where a refresh interval (TIME_VALUE) designated by the Path message is short may be set as a path whose Priority is high. For example, based on the refresh interval, the Priority may be set. The Priority may be set by combining the above-mentioned methods.

The restart node performs label swapping with the adjacent node on the uplink side or the downlink side, and writes, into the label table, uplink-side node information and the Priority of a received LSP, in addition to label information (an input label value (in) and an output label value (out)). Table update processing is executed.

Figure 7:
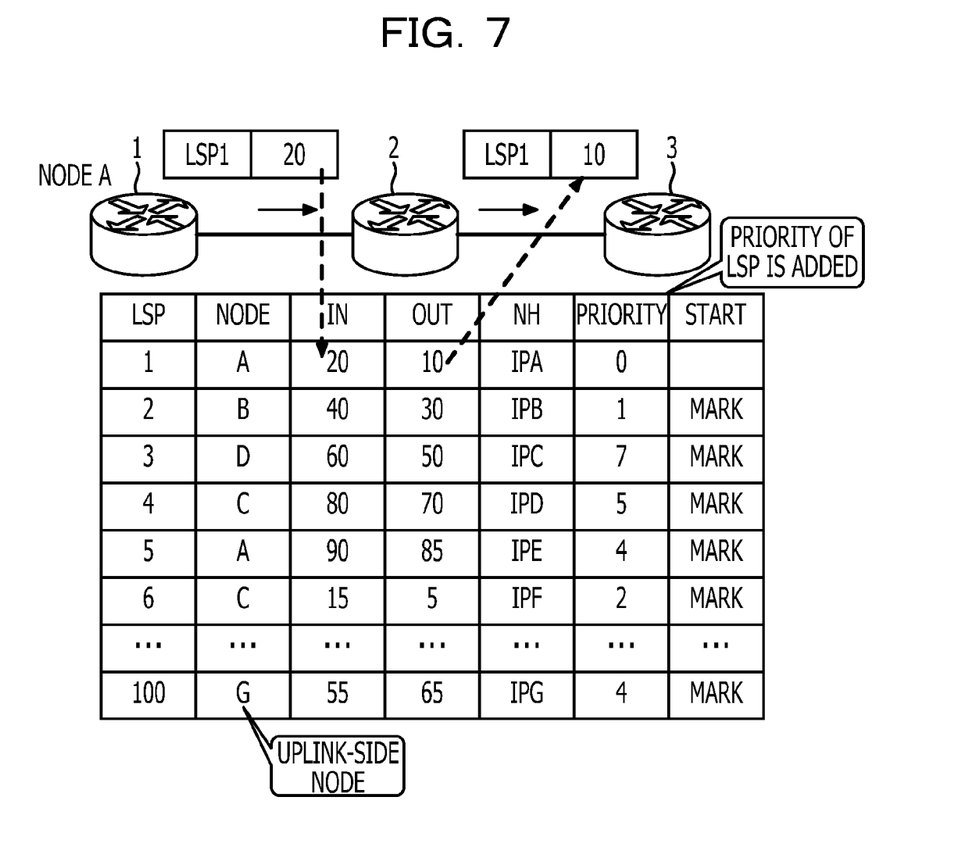
FIG. 7 illustrates an exemplary label table.

FIG. 7 illustrates an exemplary label table. With regarding an LSP number as an entry, the label table includes the node name of a transmission source, an input label value (in), an output label value (out), a next hop (NH), priority (Priority), and stale.

In a sequence SQ13, after restart, the restart node performs marking on the "stale" of every entry in the label table.

In a sequence SQ14, the restart node executes restart order determination processing, and selects one or more adjacent nodes to be restarted. The restart node designates a recovery time, in a "Restart_Cap Object" within the HELLO message. Within the recovery time, executing recovery processing where the label table is refreshed and restored is notified to the adjacent node on the uplink side and the adjacent node on the downlink side which are selected in the restart order determination processing as one or more adjacent nodes or a plurality of adjacent nodes to be restarted. When having received the "Restart_Cap Object" of the HELLO message, the adjacent nodes on the uplink side and the downlink side perform marking on the "stale" of entries in the label tables, the entries corresponding to the restart node.

In a sequence SQ15, using a "Recovery Label Object" of the Path message, the adjacent node on the uplink side gives notice of a label distributed by the restart node in an LSP where refresh is to be performed.

In a sequence SQ16, based on the label value of the "Recovery Label Object" of the notified Path message, the restart node refers to the label table and acquires a label value distributed from the adjacent node on the downlink side. Based on the label value, a label value distributed to the LSP and the node on the uplink side and the label value distributed from the adjacent node on the downlink side are acquired, the state of RSVP-TE is restored, and the "stale" of the label table is deleted.

For example, when a Path message of an input label value=20 has been supplied from an adjacent node A on the uplink side to the restart node, the restart node refers to the label table using the input label value=20, and obtains an output label value=10 and a next hop=IPa, as illustrated in the first row in FIG. 7. The restart node deletes the marking of the "stale" of an entry in the label table, changes the label value of the Path message to an output label value=10, and transmits to the adjacent node on the downlink side corresponding to the next hop=IPa.

In a sequence SQ17, using a "Suggested Label Object" of the Path message, the restart node notifies the adjacent node on the downlink side of the label distributed by the adjacent node on the downlink side in the LSP. The adjacent node on the downlink side that has received the label deletes the "stale" of the label table. When a Resv message from the adjacent node on the downlink side has been notified to the adjacent node on the uplink side through the restart node, the adjacent node on the uplink side deletes the marking of the "stale" of the label table.

In a sequence SQ18, the sequences SQ14 to SQ17 are repeated with respect to all LSPs, and the restart node restores the whole state of the label table. When the recovery time has elapsed, the restart node deletes an entry where marking has been performed on "stale" so as to delete an unrefreshed LSP from the label table.

In a sequence SQ19, when the recovery time received from the restart node has elapsed, the adjacent node deletes an entry where marking has been performed on "stale" so as to delete an unrefreshed LSP from the label table.

Figure 8A:
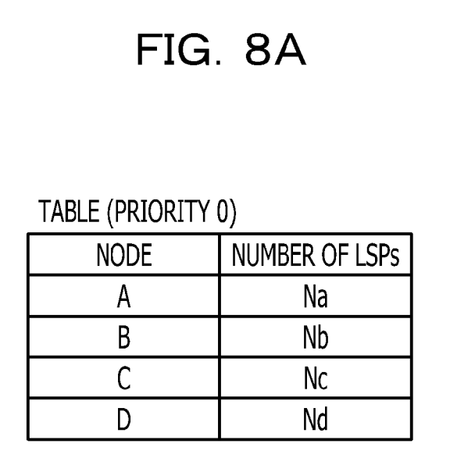
FIGS. 8A to 8C illustrate an exemplary node information table.
Figure 8B:
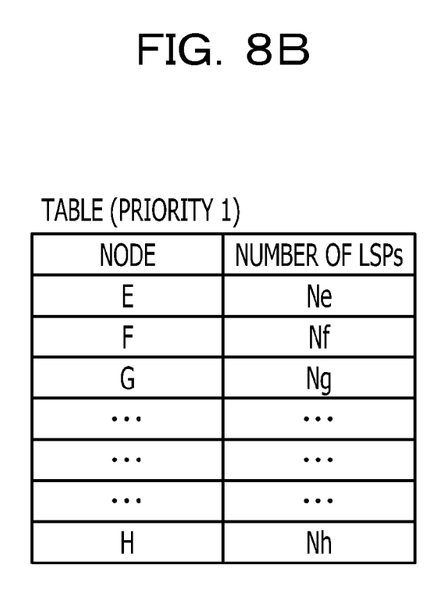
Figure 8C:
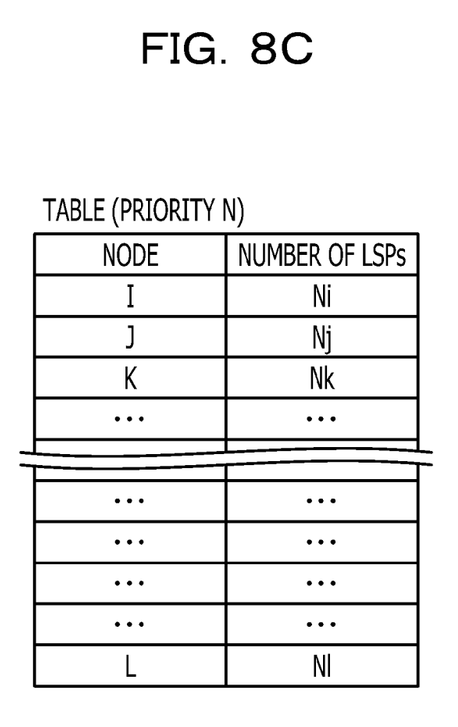

FIGS. 8A to 8C illustrate an exemplary node information table. The node information table may be created within the memory 22 with respect to each priority. FIG. 8A illustrates the node information table of Priority 0, FIG. 8B illustrates the node information table of Priority 1, and FIG. 8C illustrates the node information table of Priority 2. The Priority may increase (priority is given) with a decrease in the value of the Priority. With regarding an adjacent node name on the uplink side as an entry, the node information table of each Priority registers therein the number of LSPs created between the adjacent node on the uplink side and the self-node, for example, the restart node.

For example, in FIG. 8A, LSPs whose number is Na are created with an adjacent node A on the uplink side serving as the first entry, and the highest Priority among the LSPs whose number is Na may be the Priority 0. In FIG. 8B, LSPs whose number is Ne are created with an adjacent node E on the uplink side serving as the first entry, and the highest Priority among the LSPs whose number is Ne may be the Priority 1.

Figure 9:
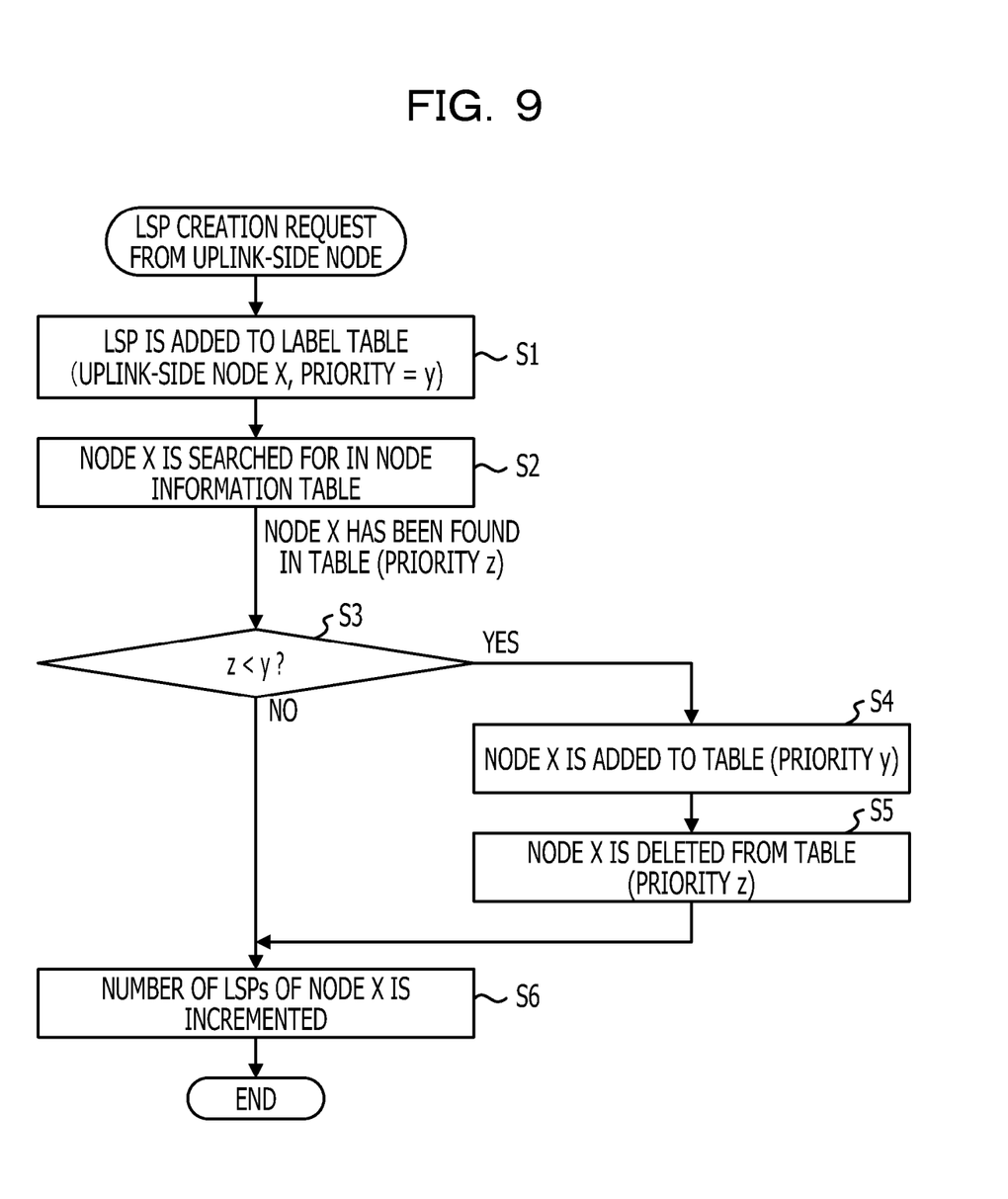
FIG. 9 illustrates an exemplary table update processing.

FIG. 9 illustrates an exemplary table update processing. The table update processing may be performed in the sequence SQ12. The table update processing is started based on the notification of an LSP creation request from an adjacent node on the uplink side.

In FIG. 9, in an operation S1, the data reception unit 15 adds an LSP to the label table within the table memory 16 in accordance with the LSP creation request received from the adjacent node on the uplink side. For example, an LSP of Priority y may be added from an adjacent node x on the uplink side.

In an operation S2, the CPU 21 searches the node information table within the memory 22 using the adjacent node x on the uplink side serving as the transmission source of the LSP creation request. For example, the adjacent node x on the uplink side may be searched for in the node information table of priority z. For example, when the adjacent node x has not been searched for, a maximum value (the lowest priority) is set as the priority z.

In an operation S3, the CPU 21 compares the priority z of the searched node information table with the priority y of the LSP creation request. When z<y is satisfied, the processing proceeds to an operation S4, and when z≥y is satisfied, the processing proceeds to an operation S6. In the operation S4, the CPU 21 adds the entry of the adjacent node x to the node information table of the Priority y. In an operation S5, the CPU 21 deletes the entry of the adjacent node x from the node information table of the priority z.

In the operation S4, the entry of the adjacent node x is copied from the node information table of the priority z, and pasted into the node information table of the Priority y. For example, when the priority of an LSP newly created from the adjacent node x is higher than the priority of a previous LSP from the adjacent node x, the priority of the adjacent node x is updated to the priority of the newly created LSP.

After the execution of the operation S5 or when z≥y is satisfied in the operation S3, the processing proceeds to the operation S6. In the operation S6, the CPU 21 adds "1" to the number Nx of LSPs in the entry of the adjacent node x, in the node information table of the priority y or z. Therefore, the adjacent node on the uplink side belongs to a table having the highest priority among possessed LSPs.

Figure 10:
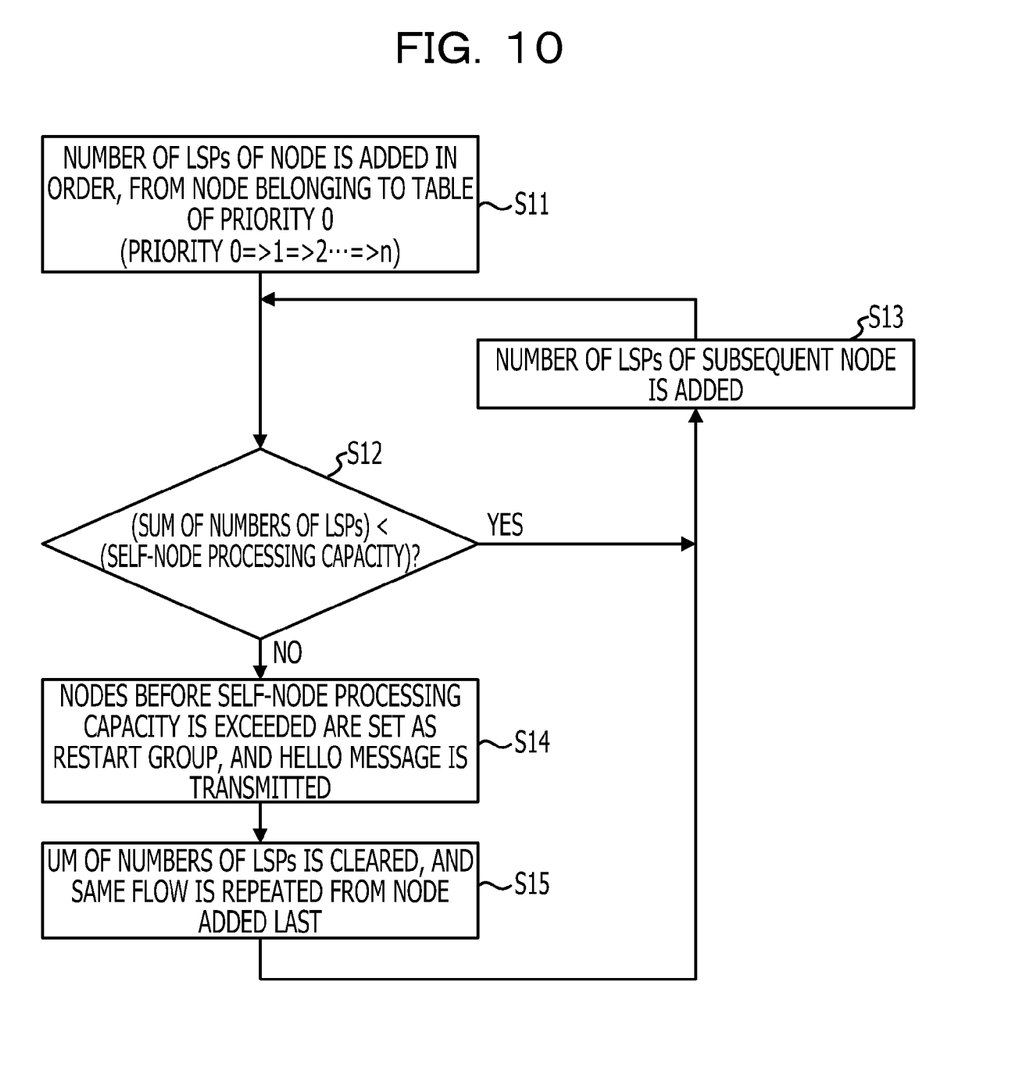
FIG. 10 illustrates an exemplary restart order determination processing.

FIG. 10 illustrates an exemplary restart order determination processing. A restart order indicates the order of adjacent nodes to which HELLO messages are transmitted from the restart node at the time of restart. In the restart order determination processing, the restart order may be determined in harmony with the node processing capacity of the self-node, in accordance with the priority of the adjacent node. The node processing capacity indicates the number of LSPs where the restart node is able to perform the recovery processing within the recovery time, and may be determined based on the operation speed of a node or the like. If the node processing capacity (the number of LSPs) of the self-device is less than or equal to an upper limit value determined by hardware, the node processing capacity may be set in accordance with the processing capacity of an opposite device or the like.

In FIG. 10, after device restart, in an operation S11, the CPU 21 refers to the node information table, and adds the number of LSPs to the sum of the numbers of LSPs, in order with an adjacent node belonging to the table of the Priority 0 of high priority first. In an operation S12, the CPU 21 determines whether or not the sum of the numbers of LSPs exceeds the number of LSPs corresponding to the node processing capacity. When the sum of the numbers of LSPs is less than the number of LSPs corresponding to a self-node processing capacity, the CPU 21 adds the number of LSPs of a subsequent adjacent node in the node information table, in an operation S13, and repeats the determination in the operation S12.

In the operation S12, when the sum of the numbers of LSPs exceeds the number of LSPs corresponding to the node processing capacity, the addition is suspended. In an operation S14, a plurality of adjacent nodes ranging to an adjacent node immediately before the number of LSPs corresponding to the node processing capacity is exceeded are set as a restart group, and a HELLO message is transmitted to the plural adjacent nodes serving as the restart group. All LSPs from the adjacent nodes serving as the restart group may be refreshed.

In an operation S15, the CPU 21 clears, for example, reset, to zero, the sum of the numbers of LSPs, and sets, as a subsequent adjacent node in the node information table, an adjacent node added last in the previous addition of the number of LSPs. The processing proceeds to an operation S13. In the operation S13, the CPU 21 adds, to the sum of the numbers of LSPs, the number of LSPs of the subsequent adjacent node in the node information table, and repeats the determination in the operation S12.

For example, the numbers of LSPs, Na, Nb, and Nc, belonging to the node information table of the Priority 0 illustrated in FIG. 8A, are added. When the sum of the numbers of LSPs exceeds the number of LSPs corresponding to the self-node processing capacity, the addition is suspended. For example, the adjacent nodes A and B within the range of the processing capacity are set as the first restart group. A HELLO message is transmitted to the adjacent nodes A and B serving as the first restart group, and the recovery processing is executed. The number of LSPs is cleared, and the same processing is executed from the node C added last at the time of previous calculation.

After the recovery processing with respect to the first restart group to which the HELLO message has been transmitted at a previous time has been completed, a HELLO message is transmitted to the second restart group obtained by a recalculation, and the recovery processing is executed. After the termination of the addition of the node information table of the Priority 0, the numbers of LSPs, Ne, Nf, . . . , of nodes belonging to the node information table of the Priority 1 are added. The above-mentioned processing may be executed with respect to all nodes recorded in the node information table.

Figure 11:
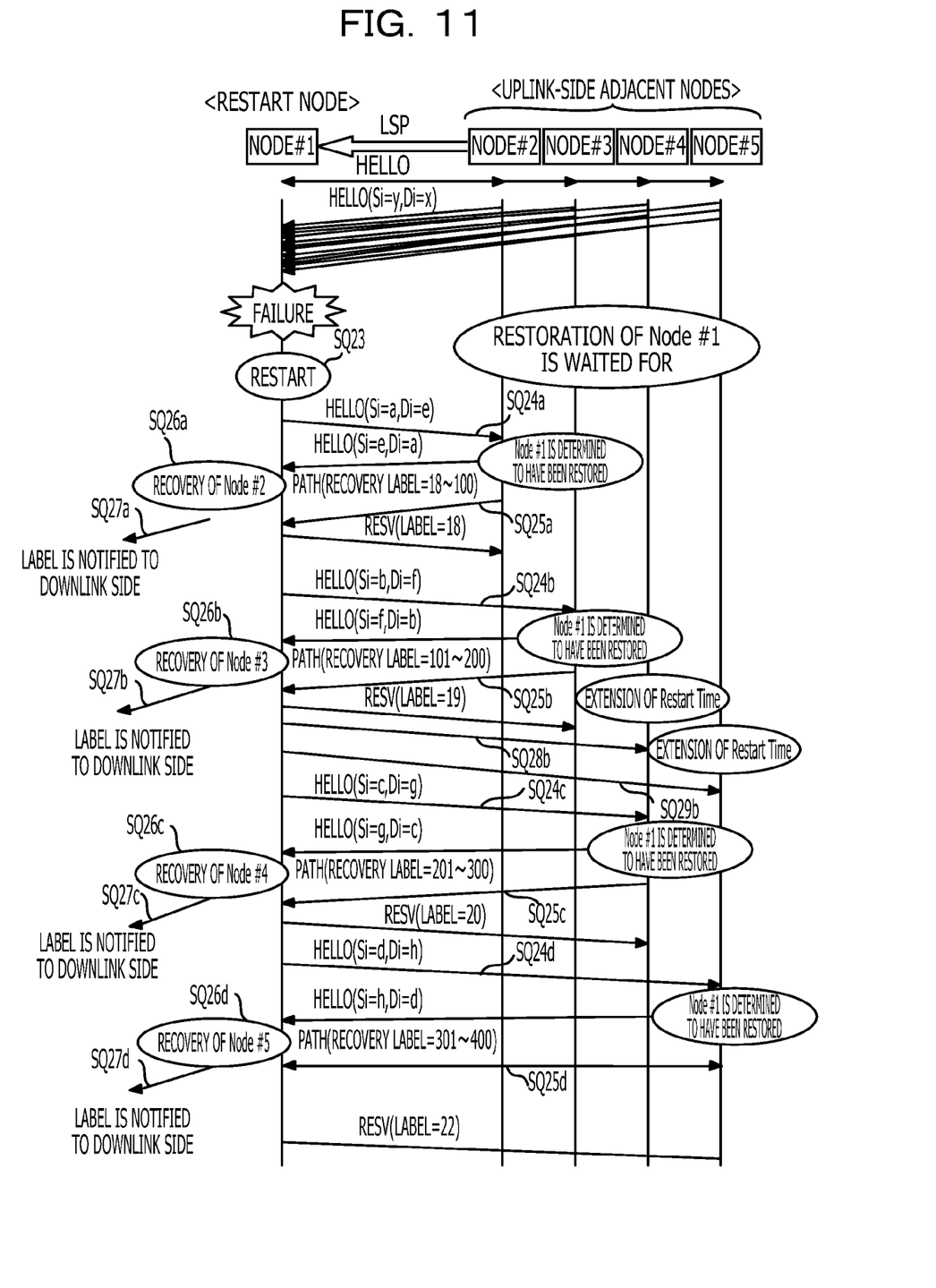
FIG. 11 illustrates an exemplary recovery processing for Graceful-Restart.

FIG. 11 illustrates an exemplary recovery processing for Graceful-Restart. In FIG. 11, a node #1 serving as the restart node restarts from a failure occurrence (a sequence SQ23a), and a HELLO message is transmitted from the node #1 to an adjacent node #2 on the uplink side (a sequence SQ24a).

After the recovery processing for the node #2 has been completed (sequences SQ25a to SQ27a), the node #1 transmits a HELLO message to a node #3 (a sequence SQ24b), and implements the recovery processing in the same way as the node #2 (sequences SQ25b to SQ27b). In the same way, the recovery processing is repeated for a node #4 and a node #5.

While, in FIG. 11, the nodes #2 to #5 are illustrated as individual nodes, the nodes #2 to #5 may also be set as a restart group. The recovery processing for the restart group #2 is performed from the node #1. The number of LSPs included in the restart group #2 may be a number within a range where the node #1 is able to complete the recovery processing within the recovery time. In the same way, the processing may be repeated for a restart group #3 and a restart group #4.

The transmission order of the HELLO message may be a restart order determined from the node information table based on the priority of an LSP. For example, with respect to the nodes (or restart groups) #3 and #4 that are not restored within a preliminarily set restart time, extension of the restart time may be performed as illustrated in FIG. 11 (sequences SQ28b and SQ29b).

The restart node may transmit a HELLO message to only adjacent nodes on the uplink side, whose number is able to be processed by the restart node itself. After the completion of the recovery processing, using the same process, a HELLO message is transmitted to other adjacent nodes on the uplink side, whose number is processable, and the recovery processing is performed. By repeating the above-mentioned operation, the recovery processing is executed, and the congestion of the recovery processing may be reduced, and restart may be smoothly performed.

For example, a field of 20 bits is assigned to an MPLS label, and a label value is assigned that ranges from "0" to "1048575". For example, by recovery processing congestion, processing for acquiring new labels may be performed on all labels whose number is 10485754. When a time taken for processing to acquire one label is 1 ms, while a communication disconnection time is 1048575×1 ms=1048.6 s≈17 min, the communication disconnection time may be reduced to "0".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A restart method that performs restart in a label transfer network, the restart method comprising:
    selecting, by a restart node, one or more adjacent nodes based on a processing capacity of the restart node, setting a selected adjacent node as a restart group and notifying the selected adjacent node of restart;
    selecting an adjacent node where the restart is to be performed by searching one or more node information tables in descending order of a priority of the one or more node information tables;
    restoring, based on a label value of a path notified by the selected adjacent node, an entry corresponding to the path using a label table that associates the path with the label; and
    repeating a notification of restart and a restoration of an entry to restore the label table.

2. The restart method according to claim 1,
    wherein the one or more node information tables register an adjacent node and a number of paths between the adjacent node and the restart node.

3. The restart method according to claim 2, further comprising:
    adding the number of paths between the adjacent node and the restart node for each adjacent node; and
    selecting, as the restart group, one or more adjacent nodes that are searched until a total number exceeds a certain number.

4. The restart method according to claim 2, further comprising:
    comparing a priority of a new path with a priority of the node information table when the new path is set; and
    changing the priority of the adjacent node in the node information table to the priority of the new path when the priority of the new path is higher than the priority of the node information table.

5. The restart method according to claim 2, wherein
    the priority is included in a message transmitted or received between the adjacent node and the restart node.

6. The restart method according to claim 2, wherein
    the priority of the path is higher as a refresh interval included in a message transmitted or received between the adjacent node and the restart node is shorter.

7. A node device that performs restart in a label transfer network, the node device comprising:
    a notification mechanism configured to select one or more adjacent nodes based on a processing capacity of a restart node, set a selected adjacent node as a restart group and notify the selected adjacent node of restart; and
    a restoration mechanism configured to restore, based on a label value of a path notified by the selected adjacent node, an entry corresponding to the path using a label table that associates the path with the label,
    wherein a notification of the notification mechanism and a restoration of the restoration mechanism are repeated to restore the label table, and
    wherein the notification mechanism selects an adjacent node where the restart is to be performed by searching one or more node information tables in descending order of a priority of the one or more node information tables.

8. The node device according to claim 7,
    wherein the one or more node information tables are configured to register an adjacent node and a number of paths between the adjacent node and the restart node for the priority.

9. The node device according to claim 8, wherein
    the notification mechanism adds a number of paths between the adjacent node and the restart node for each adjacent node and selects, as the restart group, one or more adjacent nodes that are searched until a total number exceeds a number of the adjacent nodes in the restart group.

10. The node device according to claim 8, further comprising a change mechanism configured to compare a priority of a new path with a priority of the node information table when the new path is set from an adjacent node, and change a priority of the adjacent node in the node information table to the priority of the new path when the priority of the new path is higher than the priority of the adjacent node.

11. The node device according to claim 8, wherein
    the priority is included in a message transmitted or received with the adjacent node.

12. The node device according to claim 8, wherein
    the priority of the path is higher as a refresh interval included in a message transmitted or received with the adjacent node is shorter.

* * * * *